UNITED STATES PATENT OFFICE.

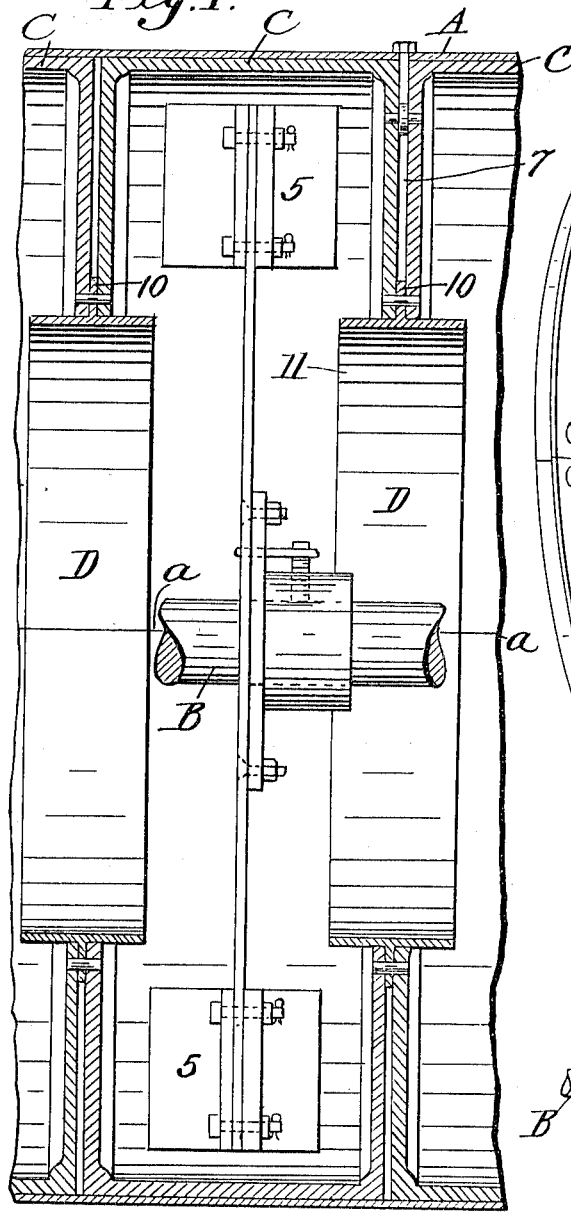
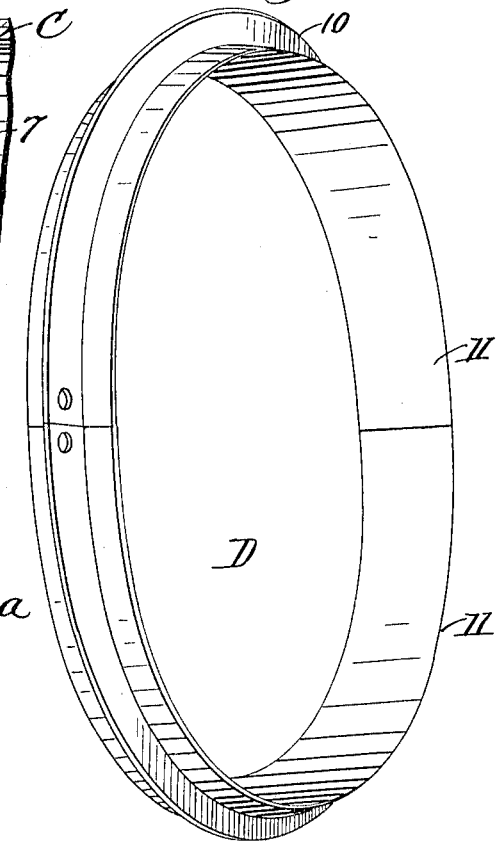

JOHN E. BLAKE, DECEASED, LATE OF PITTSBURGH, PENNSYLVANIA, BY REBECCA E. BLAKE, EXECUTRIX, OF PITTSBURGH, PENNSYLVANIA, ASSIGNOR TO BLAKE CRUSHER AND PULVERIZER COMPANY, OF PITTSBURGH, PENNSYLVANIA, A CORPORATION OF PENNSYLVANIA.

PULVERIZER.

1,080,532.  Specification of Letters Patent.  Patented Dec. 9, 1913.

Application filed April 14, 1913. Serial No. 760,938.

*To all whom it may concern:*

Be it known that JOHN E. BLAKE, deceased, late a citizen of the United States, and residing in the city of Pittsburgh, in the county of Allegheny and State of Pennsylvania, did invent or discover new and useful Improvements in Pulverizers, of which the following is a specification.

The invention consists in new and useful improvements in rotary pulverizers for fuel and similar purposes.

The difficulty with pulverizers of this type has been the tendency of a portion of the unpowdered or unreduced particles of fuel to escape with the properly pulverized fuel, resulting in slower ignition, less complete combustion, loss of fuel values and an excess of ash. The present invention provides efficient means for overcoming this fault and for retaining the coarser grains or particles of material in the paddle zones until they are reduced to an impalpable powder.

In the accompanying drawings Figure 1 is a broken longitudinal section of a rotary pulverizer embodying the present invention and showing one of the pulverizing chambers and portions of the two adjoining pulverizing chambers, Fig. 2 is a perspective of the annular member which is preferably used in connection with the invention, and Fig. 3 is a reduced side elevation of a rotary pulverizer, the present invention being indicated in dotted lines as are also the pulverizing chambers and fan chamber.

The following is a detailed description of the drawings:

A represents a rotary pulverizer consisting of a horizontal, cylindrical casing containing pulverizing chambers 1, 2 and 3, and fan chamber 4.

B is a rotary shaft extending axially through the pulverizer and having mounted thereon in pulverizing chambers 1, 2 and 3 the paddles 5, and in the fan chamber 4, the fan blades 6.

The fuel is introduced into pulverizing chamber 1 through a port, not shown and after progressing through the several pulverizing chambers 1, 2 and 3 and being reduced is discharged into the fuel pipe, not shown, from fan chamber 4, the suction of the fan drawing the fuel through the pulverizer. The various chambers are separated by annular partitions 7 having a central opening or port concentric with the shaft B. In the present case said partitions are shown formed by a pair of slightly separated plates or flanges of the drums C, which form the individual chambers. Said drums are frequently severed diametrically, as shown at $a$, Fig. 1, to enable the pulverizer chamber to be opened up, by swinging back or removing the top half, for access to the interior.

To prevent the unpowdered elements from passing through from one chamber to the other and escaping into the fuel pipe the present invention provides lateral extensions or flanges extending from said annular partitions into said pulverizing chambers within the zone of travel of the paddles 5, partially inclosing an annular chamber in which said paddles travel. To provide such flanges and conveniently mounting the same an annular member D is provided, preferably made in two semi-annular parts for the sake of convenience. Said member is substantially T shape in cross section, the radial fin 10 being secured between the plates forming the annular partitions 7 while the lateral extensions 11 extend into the pulverizing chambers. The result of the provision of said lateral flanges is that the coarser particles or grains of fuel being treated in a pulverizing chamber are held in the zone of travel of the paddles until thoroughly reduced while the finely pulverized or powdered elements are drawn through the central openings in partitions 7 into the fan chamber and expelled into the fuel pipe.

What is desired to be claimed is:—

1. In a rotary pulverizer, the combination of a casing containing a fan chamber and pulverizing chambers separated by annular partitions, a rotary shaft extending axially through said chambers, fan blades mounted on said shaft in said fan chamber, paddles mounted on said shaft within said pulverizing chambers, and lateral extensions on said partitions extending into said pulverizing chambers within the zone of travel of said paddles.

2. In a rotary pulverizer, the combination of a casing containing a fan chamber and pulverizing chambers contained in said casing, a rotary shaft extending axially through said chambers, fan blades mounted on said shaft in said fan chamber, paddles mounted on said shaft in said pulverizing chamber, and annular partitions separating said pulverizing chambers, said partitions having lateral extensions extending into said pulverizing chambers, for the purpose described.

Signed at Pittsburgh, Pa., this 7th day of April, 1913.

REBECCA E. BLAKE,
*Executrix of John E. Blake, deceased.*

Witnesses:
CHAS. T. EILENMEYER,
H. W. DOUGLASS.

Copies of this patent may be obtained for five cents each, by addressing the "Commissioner of Patents, Washington, D. C."